United States Patent [19]

Goetz, Jr.

[11] Patent Number: 5,384,450
[45] Date of Patent: * Jan. 24, 1995

[54] BAR CODE READER FOR A SINGULATED PRODUCT STREAM

[75] Inventor: Walter C. Goetz, Jr., Arlington, Tex.

[73] Assignee: ElectroCom Automation L.P., Arlington, Tex.

[ * ] Notice: The portion of the term of this patent subsequent to Apr. 13, 2010 has been disclaimed.

[21] Appl. No.: 864,574

[22] Filed: Apr. 6, 1992

[51] Int. Cl.⁶ ............................................. G06K 7/10
[52] U.S. Cl. .................... 235/462; 235/383
[58] Field of Search ............ 235/472, 383, 375, 462, 235/467

[56] References Cited

U.S. PATENT DOCUMENTS

| | | | |
|---|---|---|---|
| 4,071,740 | 1/1978 | Gogulski | 235/431 |
| 4,193,540 | 3/1980 | Dougados et al. | 235/467 |
| 4,558,212 | 12/1985 | Hampson | 235/383 |
| 4,575,623 | 3/1986 | Connoi et al. | 235/383 |
| 4,652,732 | 3/1987 | Nickl | 235/462 |
| 4,762,984 | 8/1988 | Knowles et al. | 235/383 |
| 4,939,355 | 7/1990 | Rando et al. | 235/467 |
| 4,988,851 | 1/1991 | Kohno et al. | 235/383 |
| 5,113,060 | 5/1992 | Wike, Jr. et al. | 235/383 |
| 5,138,141 | 8/1992 | Blanford et al. | 235/462 |
| 5,155,345 | 10/1992 | Ito | 235/462 |
| 5,186,336 | 2/1993 | Pippin et al. | 209/583 |
| 5,201,397 | 4/1993 | Isaacs | 198/395 |
| 5,202,557 | 4/1993 | Robertson | 235/462 |
| 5,206,491 | 4/1993 | Katoh et al. | 235/467 |
| 5,252,814 | 10/1993 | Tooley | 235/383 |
| 5,256,864 | 10/1993 | Rando et al. | 235/383 |

FOREIGN PATENT DOCUMENTS

| | | | |
|---|---|---|---|
| 2114676 | 4/1978 | Germany | 235/383 |
| 2161631 | 1/1986 | United Kingdom | 235/383 |

Primary Examiner—Raymond A. Nelli
Assistant Examiner—Erick Solis
Attorney, Agent, or Firm—Harold E. Meier

[57] ABSTRACT

A bar code reader for reading picket and ladder oriented bar codes from products a singulated product stream transported through a scanning zone. The bar code reader is comprised of a pair of raster scanners to scan for ladder oriented bar codes on the top surface of each product and a pair of line scanners to scan the top and bottom surface of each product for picket oriented bar codes. In a second embodiment, a second pair of raster scanners is provided in addition to the top raster scanners and the line scanners to scan the bottom surface of each product for ladder oriented bar codes. The scanned optical bar code information is decoded and transmitted to a computer for analysis to identify, count and determine the disposition, according to the scanned code, of each product in the stream.

16 Claims, 8 Drawing Sheets

BAR CODE READER FOR A SINGULATED PRODUCT STREAM

TECHNICAL FIELD

The present invention relates an apparatus for reading bar codes and, in particular to an apparatus for reading both picket and ladder oriented bar codes on a singulated stream of bar coded products moving through a virtually defined scanning zone at a relatively high throughput rate.

BACKGROUND OF THE INVENTION

For purposes of product returns and order filling, it is important to be able to sort and count products accurately and quickly. Such products, for example magazines and packages, have historically either been manually sorted and counted by human operators or manually scanned to read an affixed code, counted and then sorted by the human operator according to a product disposition signal provided from the product scanner according to the scanned code. One drawback experienced with these primarily manual methods for separating, counting and sorting is that total product processing time for sorting and counting is a function of each human operator's ability to accurately sort and count products and/or efficiently scan the products to obtain the affixed bar codes for sorting and counting. Familiarity with the product and the signals indicating the disposition of each product also factor into the processing time. An additional drawback of the conventional manual separation, counting and sorting process is its susceptibility to error resulting from careless human operators directing products into improper bins. These drawbacks result in errors in the counting of products and delays in the sorting process thereby reducing net product throughput of, and profits for the sorting and counting operation.

The most commonly used code affixed to products is the bar code. As is well known, there are two common orientations of bar codes, a ladder code orientation and a picket code orientation. These two orientations are easily distinguished from each other; a ladder code is comprised of a plurality of horizontal bars (like the rungs of a ladder) parallel to a top or bottom edge of the product, and a picket orientation is comprised of a plurality of vertical bars (like the pickets in a fence) parallel to a side edge of a product. Bar codes may be affixed to the product at any one of a number of locations on any outside product surface.

The goals of all sorting and counting operations are accuracy, low cost and high throughput product processing. The conventional manual prior art sorting and counting systems utilize an omnidirectional scanner, similar to that commonly used in grocery store checkout lines, to read the bar code off packages positioned with either a picket or ladder orientation. Omnidirectional scanners, however, are very expensive and further require that each encoded product in the singulated stream pass through the scanning zone at a relatively slow rate or be scanned more than once. Manual sorting and counting using omnidirectional scanning systems has therefore proven to be expensive and slow. Accordingly, there is a need for an inexpensive automated apparatus for accurately scanning both picket and ladder oriented bar codes from a singulated stream of coded products moving at a relatively high throughput rate.

SUMMARY OF THE INVENTION

The present invention provides a less expensive, high product throughput scanning apparatus for reading bar codes of either a picket and ladder orientation from coded products in a high throughput singulated product stream. In accordance with the broader aspects of the invention, a scanning zone is virtually defined on a scanning transport path characterized by a plurality of rotational feed rollers. The scanning transport path receives a stream of products singulated by known means (such as the product singulation apparatus disclosed in commonly assigned, co-pending application for patent Ser. No. 593,783 filed Oct. 5, 1990), with each product scanned on both its top and bottom surfaces as it passes downstream through the scanning zone for bar codes of either a picket or ladder type orientation. The scanned codes are used to count the processed products and indicate preferred product disposition. The product stream is then output from the scanning transport path and sorted (for example, by the product sorting apparatus disclosed in commonly assigned, co-pending application for patent Ser. No. 643,853 filed Jan. 22, 1991) according to the scanned bar code.

In a first embodiment of the invention, a pair of raster scanners are provided to scan for ladder oriented bar codes on the top surface of each product passing through the scanning zone. A pair of line scanners are also provided, one for the top surface and another for the bottom surface of the scanning zone, to scan each product in the singulated stream for picket oriented bar codes. As ladder oriented bar codes comprise roughly ten percent of the orientations for bar codes used on products, scanning means for ladder oriented bar codes located on the bottom product surface is not provided in the first embodiment. In a second embodiment of the invention, however, a second pair of raster scanners are provided to scan the bottom surface of each product in the singulated product stream for ladder oriented bar codes. The additional scanner cost of the second embodiment is justified when large numbers of products with affixed ladder oriented codes are anticipated in the scanning operation.

BRIEF DESCRIPTION OF THE DRAWINGS

A more complete understanding of the bar code reader for a singulated product stream may be had by reference to the following Detailed Description when taken in conjunction with the Drawings wherein.

DETAILED DESCRIPTION OF THE DRAWINGS

Figure 1:
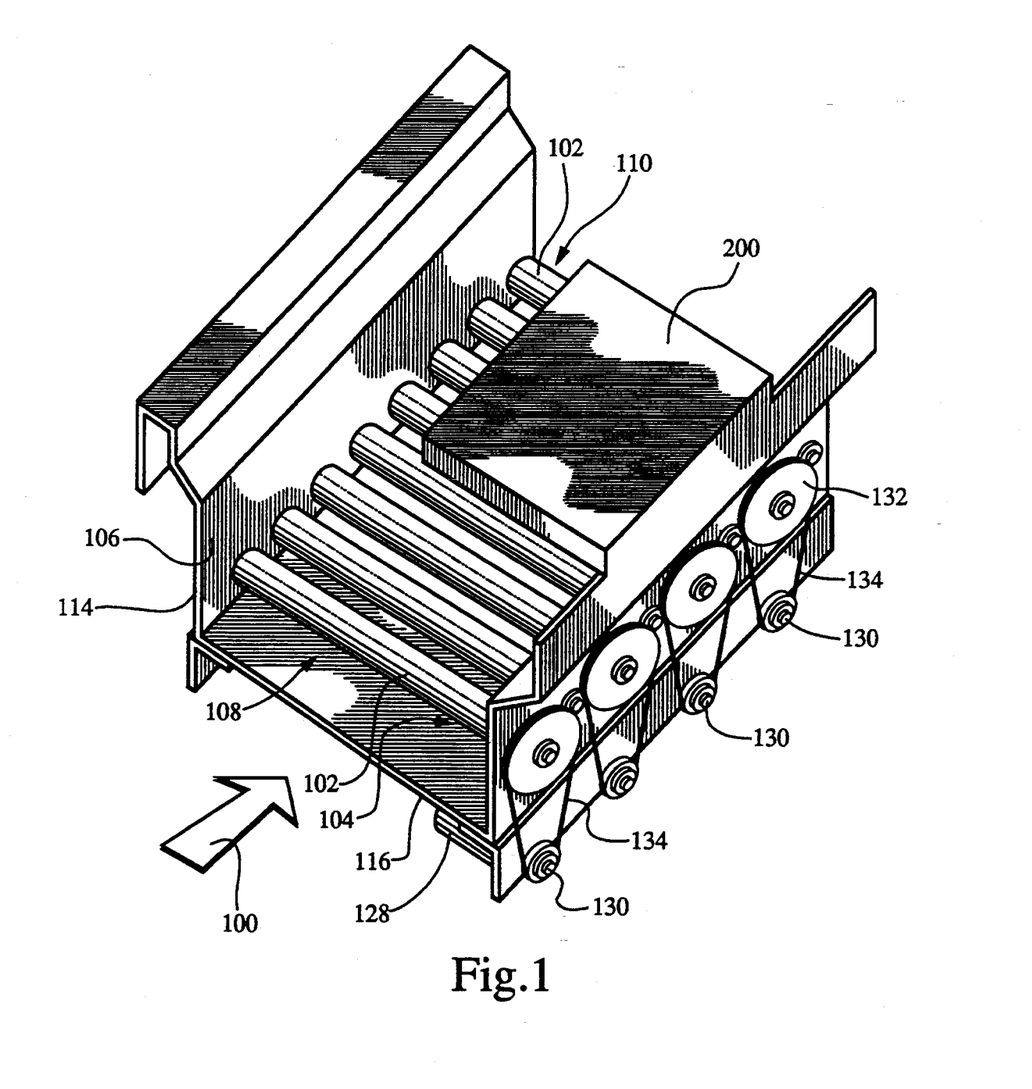
FIG. 1 is an orthogonal view of the scanning transport path and a portion of the bar code scanning system of the present invention.

Reference is now made to FIG. 1 wherein there is shown an orthogonal view of a scanning transport path, generally illustrated by arrow 100, and a portion of a bar code scanning system 200 (remaining portion hidden underneath transport path) comprising the present invention. The scanning transport path 100 includes a series of rotating feed rollers 102 arranged on a laterally tilted and inclined plane. The scanning transport path is provided with an inside and an outside rail, 104 and 106, respectively. A lateral tilt (of approximately five degrees) for the scanning transport path 100 positions the inside rail 104 at a lower elevation than the outside rail 106. Configuration of the scanning transport path 100 in this manner causes products thereon (not shown, see FIGS. 2A and 6) to slide toward and ride against the inside rail 104 in single file fashion. This positions each product with a side edge flush against (parallel to) the inside rail 104 to facilitate a more accurate identification of the products by properly orienting the picket and ladder codes affixed to the products to be scanned by the bar code scanning system 200.

The scanning transport path 100 has an infeed end 108 for receiving a stream of singulated products. An apparatus for singulating products for input to the scanning transport path 100 is disclosed in commonly assigned, co-pending application for patent Ser. No. 593,783 filed Oct. 5, 1990. The scanning transport path 100 is laterally tilted and longitudinally positioned for convenience on an incline to match the approximately five degree tilt and twenty-two degree incline of the disclosed singulating apparatus. The longitudinal incline is provided in the singulating apparatus to advantageously use gravitational forces in assisting the separation of a product stack into a singulated product stream. It will, of course, be understood that the scanning transport path 100 need not be longitudinally oriented in this manner for proper operation of the scanning system 200. The scanning transport path 100 also has an output end 110 for discharging the stream of products for subsequent sorting into designated destination bins according to their scanned bar codes. An apparatus for receiving a singulated stream of products and for sorting the product stream according to the scanned bar codes affixed thereto is disclosed in commonly assigned, co-pending application for patent Ser. No. 043,853 filed Jan. 22, 1991.

The scanning system 200 is designed to read bar codes from individual products in a singulated stream of products travelling at a relatively high throughput rate along the transport path 100. The system further operates to categorize and count processed products according to the scanned bar codes. As is known, there are two common orientations of bar codes, a ladder orientation and a picket orientation. These two types of bar code orientations are easily distinguished from each other; a ladder orientation is comprised of a plurality of horizontal bars (like the rungs of a ladder) parallel to a top or bottom edge of a product, and a picket orientation is comprised of a plurality of vertical bars (like the pickets in a fence) parallel to a side edge of the product. Either of these orientations will be read by an omnidirectional scanner similar to those commonly used in grocery store check-out lines. Omnidirectional scanners, however, are very expensive and inefficient in that each encoded product in the singulated stream must pass through the scanning zone at a relatively slow throughput rate or be scanned more than one time.

Figure 2A:
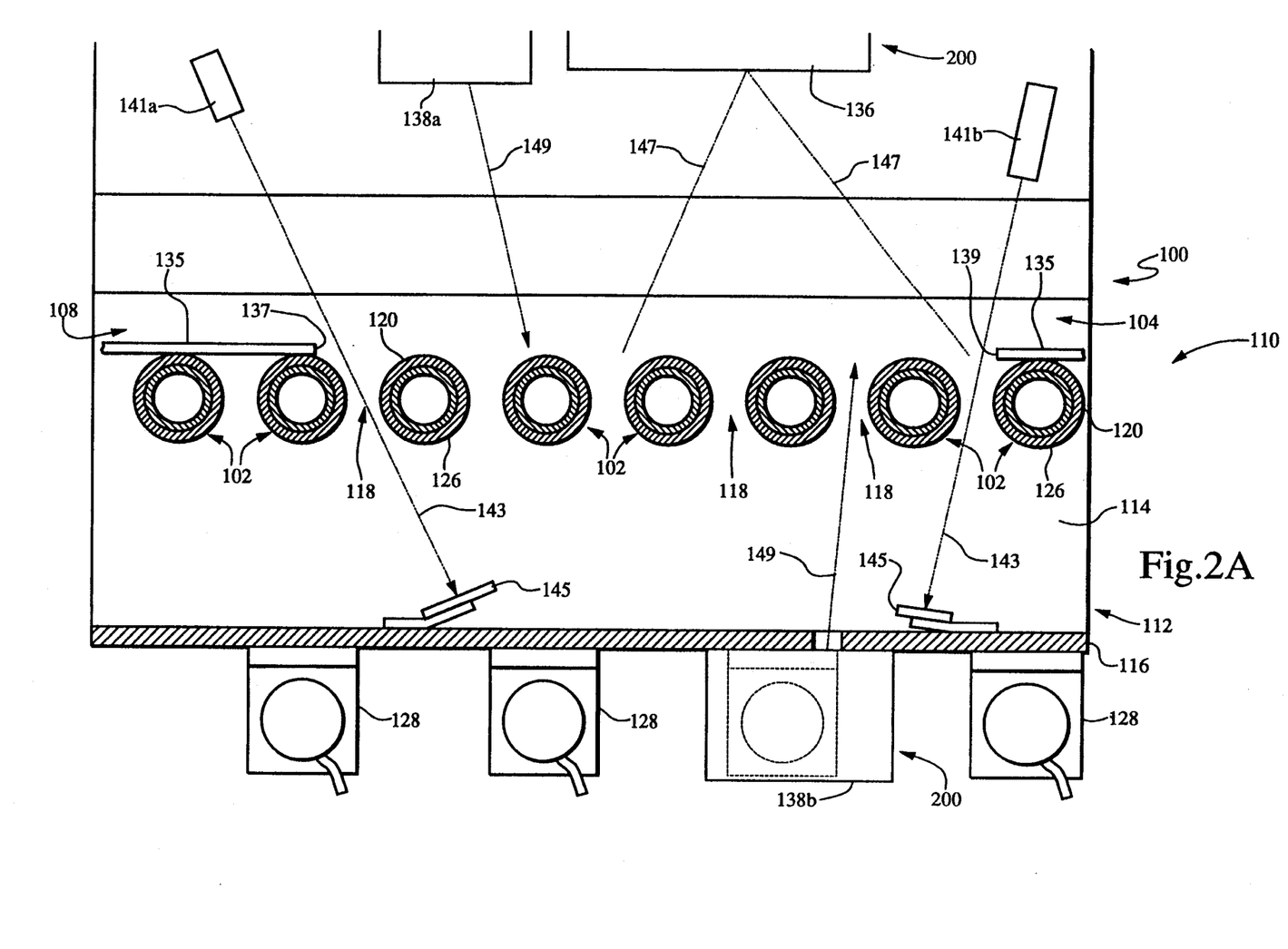
FIG. 2A is a longitudinal cross sectional view of the scanning transport path and a first embodiment of the scanning system of the present invention.
Figure 2B:
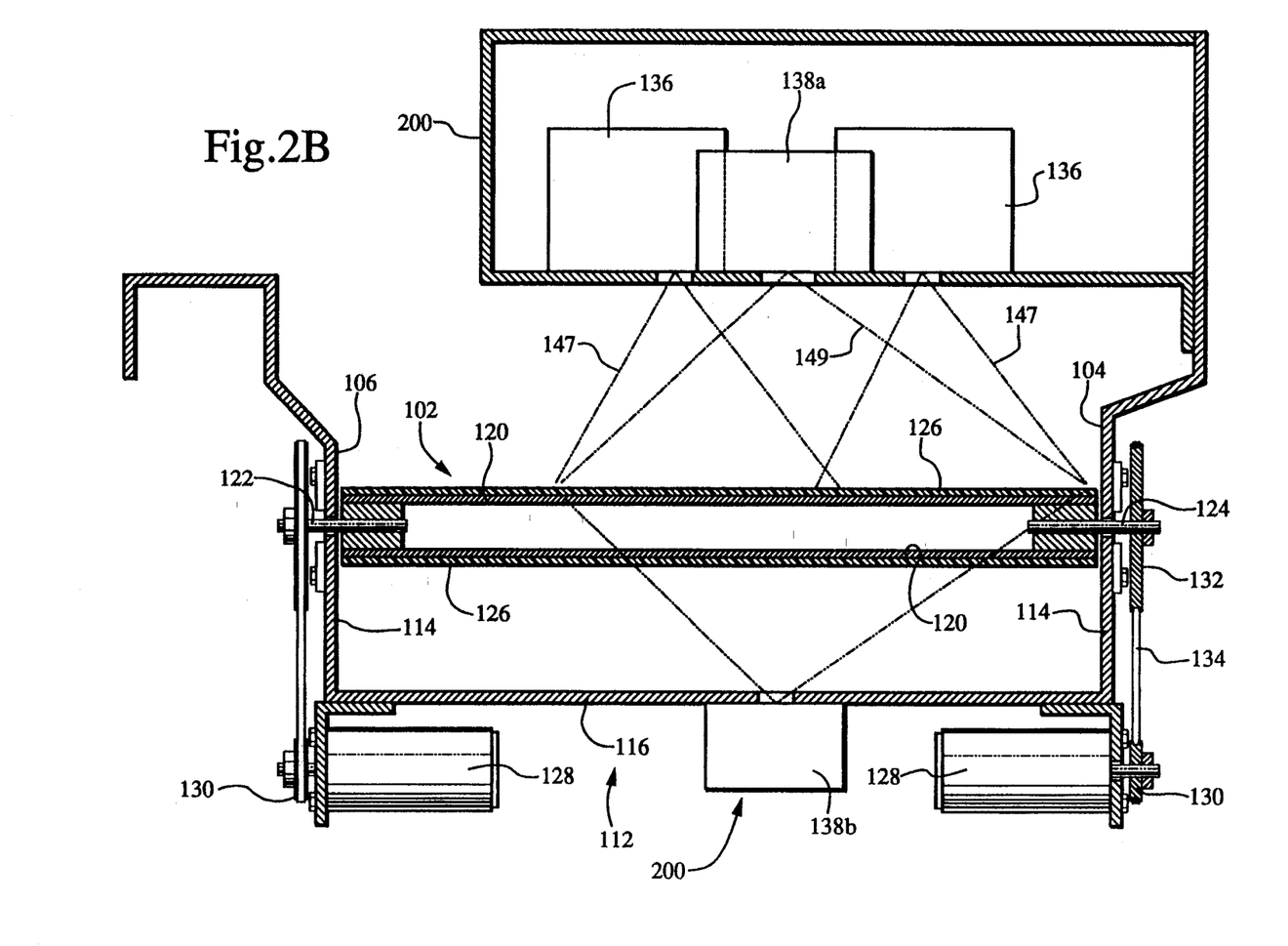
FIG. 2B is a lateral cross sectional view of the scanning transport path and a first embodiment of the scanning system of the present invention.

Reference is now made to FIGS. 2A and 2B wherein there is shown a longitudinal cross sectional view and a lateral cross sectional view, respectively, of the scanning transport path 100 and a first embodiment of the scanning system 200 of the present invention. The transport path 100 includes a series of feed rollers 102, with each feed roller rotatably mounted to a frame 112. The frame 112 is comprised of an opposed pair of longitudinally extending side plates 114 and a bottom support plate 116. The feed rollers 102 extend transversely between and perpendicular to the opposed side plates 114 and are positioned with respect to each other such that there is a gap 118 between each adjacent pair of rollers.

Each feed roller 102 is comprised of a drive shaft 120 having opposed ends, 122 and 124, with the drive shaft covered by a hard, high friction material 126. The drive mechanism for each feed roller 102 is preferably a D.C. electric motor 128 mounted to the frame 112. A pulley 130 mounted to the motor 128 directs operating power from the motor to a second pulley 132 by means of a drive belt 134. The second pulley 132 is attached to one end, either 122 or 124, of the drive shaft 120. In the preferred embodiment, one motor 128 is used to actuate one feed roller 102. As shown in FIGS. 1, 2A and 2B, motors 128 for adjacent feed rollers 102 are mounted on opposite sides of the frame 112 so that a proper gap 118 is maintained between adjacent roller pairs without causing the pulleys 130 and 132 and motors for the adjacent rollers to interfere with each other.

The scanning system 200 in the first embodiment is comprised of a pair of raster scanners 136 and a pair of line scanners 138a and 138b oriented above and below the transport path 100 in the manner shown in FIGS. 2A and 2B. As is known, a raster scanner 136 is particularly useful in reading ladder oriented bar codes and a line scanner 138 is particularly useful in reading picket oriented bar codes. The scanning system 100 is arranged such that the pair of raster scanners 136 are positioned side-by-side above the transport path 100 to scan for ladder oriented codes on a top surface of each product 135 in the singulated stream. The first line scanner 138a is positioned near the pair of raster scanners 136 above the transport path 100 to scan for picket oriented codes on the top surface of each product 135 in the singulated stream. The second line scanner 138b is positioned below the transport path 100 to scan, through the gap 118 between two adjacent feed rollers 102, for picket oriented codes on a bottom surface of each product 135 in the singulated stream.

Figure 3:
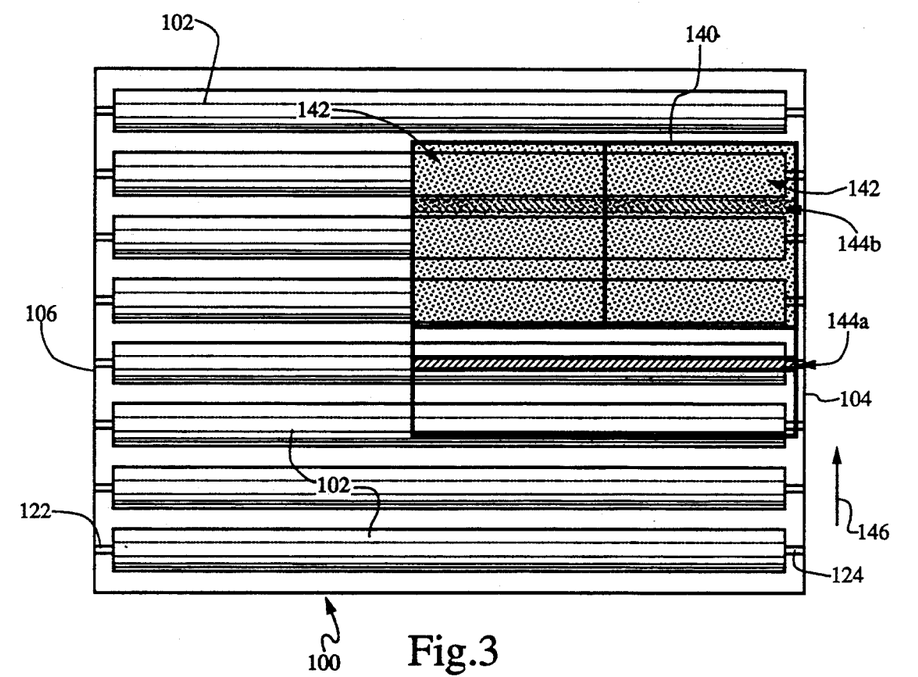
FIG. 3 is a top view of the scanning transport path showing the virtually defined scanning zone of the embodiment in FIGS. 2A and 2B.

Reference is now made to FIG. 3, wherein there is shown a top view of the scanning transport path 100. Orientation of the scanning system 200 in the manner described above results in the virtual definition of a scanning zone 140 on the transport path 100. Referring again to FIG. 2A, a pair of photocells 141a and 141b are provided at the entrance to and exit from the scanning zone 140. Each photocell 141 emits a light beam 143 that is reflected back to the photocell by a mirror 145.

The entrance photocell 141a signals the entrance of a product 135 in the singulated stream into the scanning zone 140 by detecting the leading edge 137 of the product blocking the light beam 143. The detection of the leading edge 137 of a product 135 signals a computer (see FIG. 6) to start assigning bar codes read by the scanning system 200 to a tracking record for the product passing through the scanning zone 140. The exit photocell 141b signals the exit of the product 135 from the scanning zone 140 by detecting the trailing edge 139 of the product unblocking the light beam 143. The detection of the trailing product edge of a product 135 signals the computer to stop assigning bar codes read by the scanning system 200 to the tracking record and output the bar code(s) read for the detected product.

Referring again to FIG. 3, the scanning zone 140 is offset from the longitudinal center of the transport path 100 and adjacent to the inside rail 104. With such positioning, the scanning system 200 scans, in a more efficient manner, the area of the transport path 100 where the individual products in the product stream are most likely located due to the lateral tilt of the transport path. The scanning zone 140 is comprised of a side-by-side pair of square raster scan zones 142 extending across the scanning zone and corresponding to the fields of view 147 of the two raster scanners 136 (see FIGS. 2A and 2B). The scanning zone 140 further includes a top side line scan zone 144a extending across the scanning zone and corresponding to the field of view 149 of the top line scanner 138a (see FIGS. 2A and 2B). The scanning zone 140 is further comprised of a bottom side line scan zone 144b (shown in broken lines), positioned in the gap 118 between two adjacent feed rollers 102, extending across the scanning zone and corresponding to the field of view 149 of the bottom line scanner 138b (see FIGS. 2A and 2B).

Raster scanners for reading ladder oriented codes on the bottom side of each product in the product stream are not included in the first embodiment because ladder oriented codes comprise roughly only ten to fifteen percent of the orientations used on products (for example, magazines). The pair of raster scanners 136 and the pair of line scanners 138 will therefore scan the scanning zone 140 and read the bar codes of approximately ninety-five percent of the products processed by the scanning system 200 (all products with picket oriented codes and about one-half of the products with ladder oriented codes). The products with ladder oriented codes on the bottom surface will not be read and will need to be processed either manually or fed back through the scanner with their ladder oriented codes properly placed on the top product surface. This less than five percent read failure rate does not typically justify the cost of an additional pair of raster scanners to scan bottom product surfaces in normal processing operations.

Figure 4A:
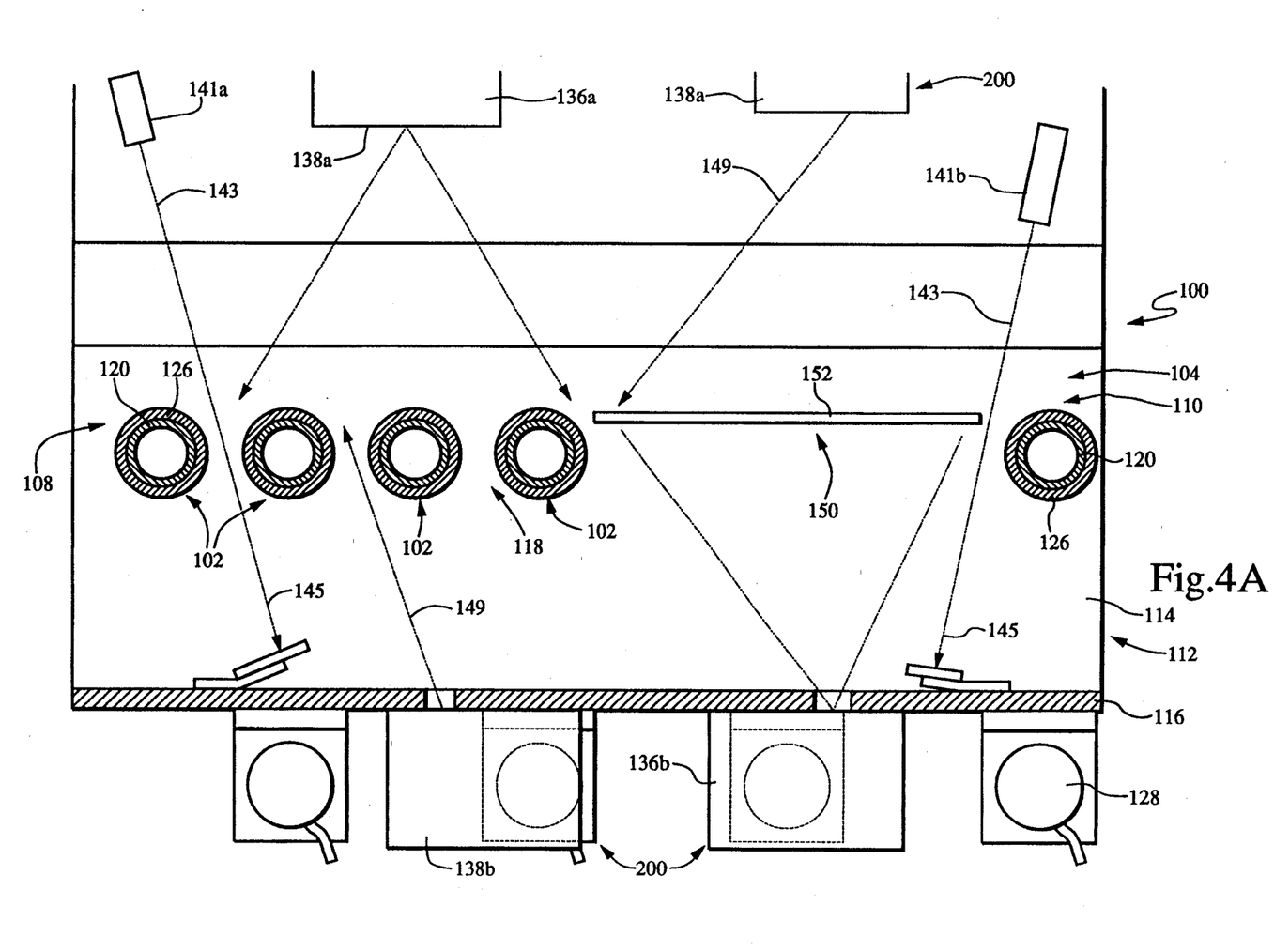
FIG. 4A is a longitudinal side view of the scanning transport path and a second embodiment of the scanning system of the present invention.
Figure 4B:
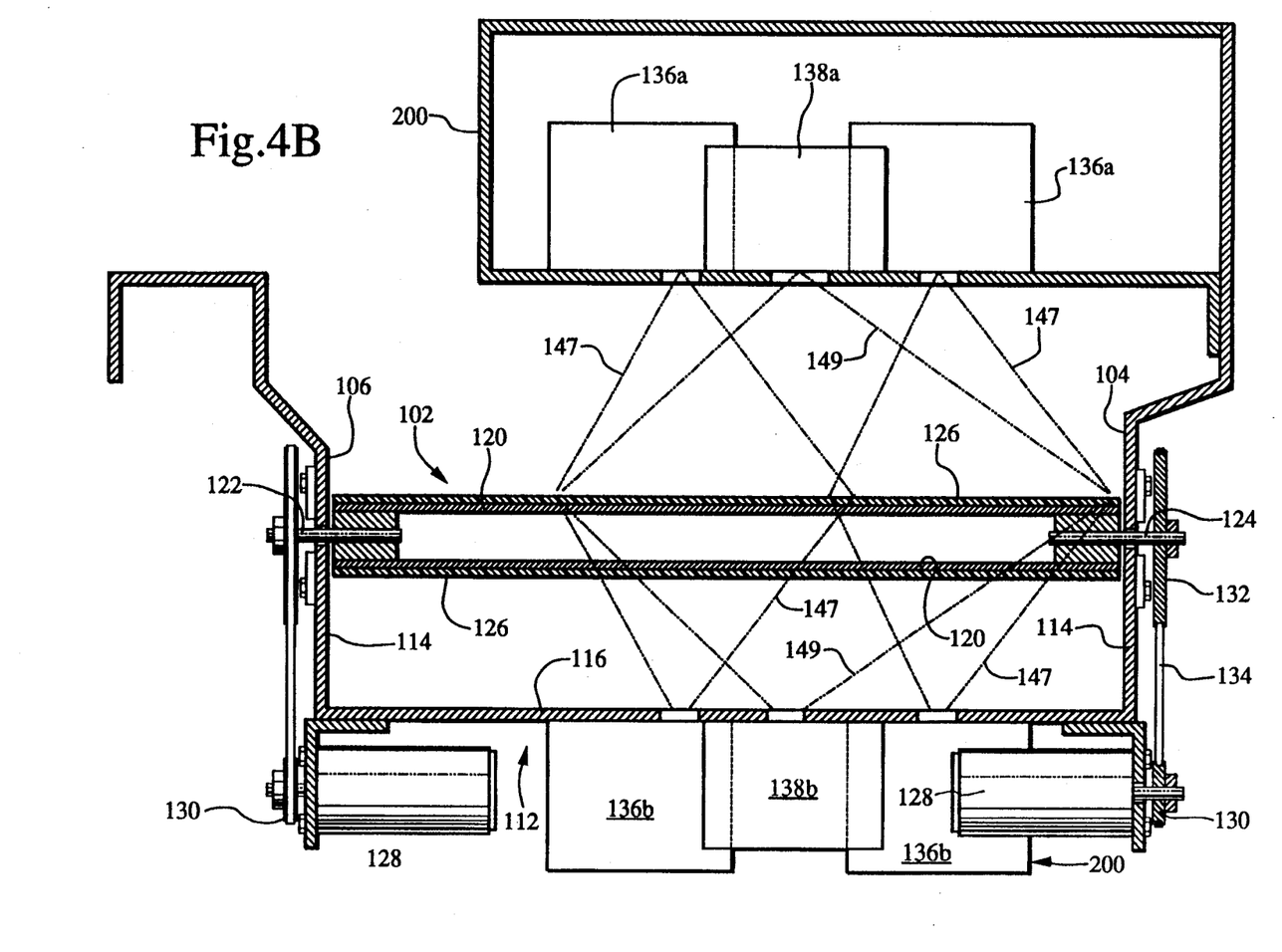
FIG. 4B is a lateral cross sectional view of the scanning transport path and a second embodiment of the scanning system of the present invention.
Figure 5:
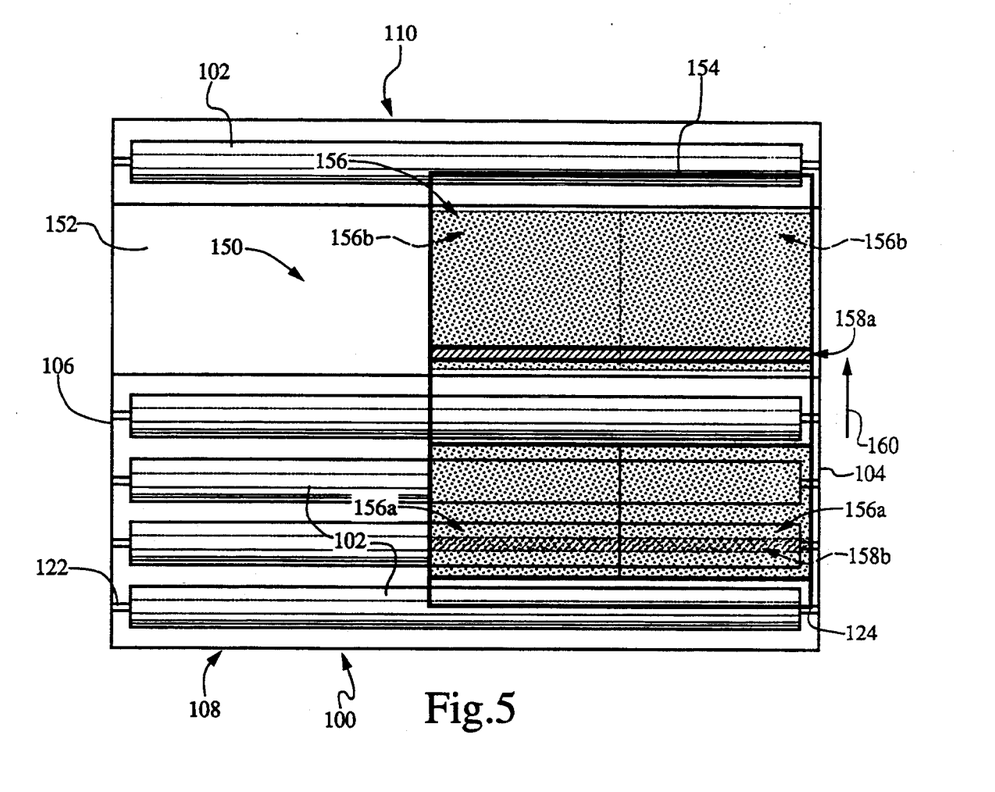
FIG. 5 is a top view of the scanning transport path showing the virtually defined scanning zone of the embodiment in FIGS. 4A and 4B.

In a second embodiment of the invention, however, as shown in FIGS. 4A, 4B and 5, a second pair of raster scanners 136b are provided to scan the bottom surface of each product in the singulated product stream for ladder oriented bar codes. The cost of the additional raster scanner 136b in the second embodiment is justified when a significant portion of the products anticipated in the scanning operation will have ladder oriented bar codes. Thus, the scanning system 200 in the second embodiment is comprised of two pairs of raster scanners 136a and 138b and a pair of line scanners 138a and 138b positioned above and below the transport path 100 in the manner shown in FIGS. 4A and 4B.

The scanning system 200 of the second embodiment is arranged such that the two pairs of raster scanners 136a and 138b are positioned side-by-side above and below the transport path 100, respectively, to scan for ladder oriented codes on the top and bottom surfaces of each product in the singulated stream. The first line scanner 138a is positioned near the top pair of raster scanners 136a above the transport path 100 to scan for picket oriented codes on the top surface of each product in the singulated stream. The second line scanner 138b is positioned near the bottom pair of raster scanners 136b below the transport path 100 to scan through the gap 118 between two adjacent feed rollers 102 for picket oriented codes on the bottom surface of each product in the singulated stream. The bottom pair of raster scanners 136b are positioned to scan through an opening 150 in the transport path defined by a piece of optical quality glass 152 or other optical quality transparent material.

Orientation of the scanning system 200 in the manner described above for the second embodiment results in a scanning zone 154 being virtually defined for the transport path. Reference is now made to FIG. 5 wherein there is shown a top view of the scanning transport path 100 showing the virtually defined scanning zone 154 of the second embodiment. The scanning zone 154 is comprised of two side-by-side pairs of square raster scan zones 156a and 156b extending across the scanning zone and corresponding to the fields of view 157 of the top and bottom pair of raster scanners, 136a and 136b, respectively (see FIGS. 4A and 4B). The scanning zone further includes two line scan zones 158a and 158b extending across the scanning zone and corresponding to the fields of view 159 of the top and bottom line scanners 138a and 138b, respectively (see FIGS. 4A and 4B). Products are transported by the transport path 100 through the top scanning zone 154 in the direction shown by arrow 160.

Figure 6:
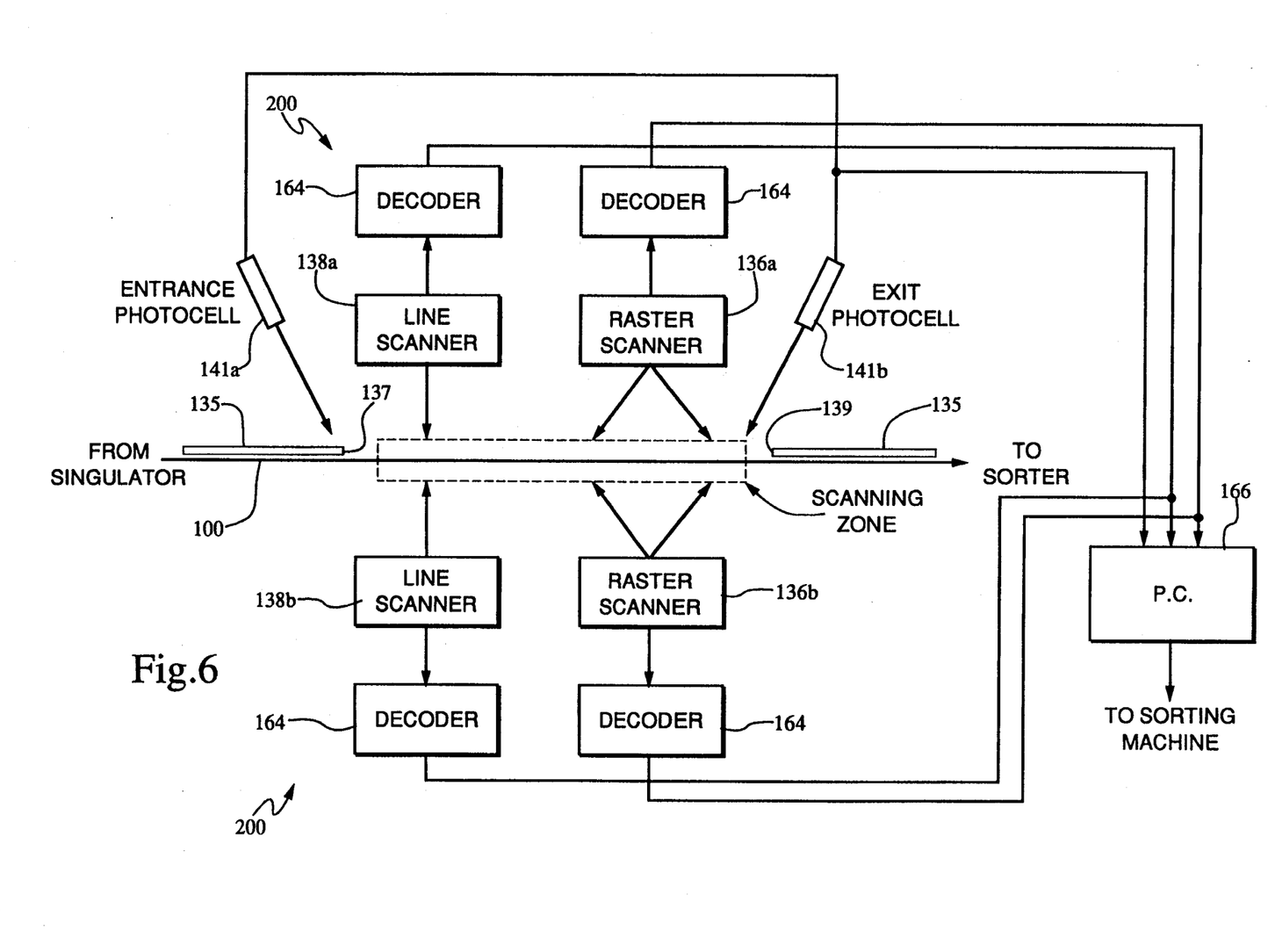
FIG. 6 is a schematic view of the scanning system of the present invention.

Reference is now made to FIG. 6 wherein there is shown a schematic view of the scanning system 200 for both embodiments of the present invention. Associated with each line scanner or raster scanner in the scanning system 200 is a decoder 164 for decoding the scanned optical information and outputting the scanned code(s). The decoding operation involves a translation of the output data formats (information signals) of each different scanner into a common, computer understandable format disclosing the scanned code. The scanned codes are then transmitted from the scanning system 200 to a host computer 166 where the codes are analyzed by means of a look-up table to determine the proper output disposition for each product. The computer 166 further accurately counts and categorizes the scanned products in the stream according to the affixed codes. The computer 166 then signals the subsequent sorting machine to sort the product stream according to the determined disposition assigned to each scanned bar code.

The raster and line scanners of the remaining system 200 constantly scan the scanning zone on the transport path 100 for bar codes. In order to associate a scanned bar code with a particular product 135 moving along the transport path 100, the computer 166 uses the photocells 141 at the entrance to and exit from the scanning zone to identify and track products. The computer 166 thus recognizes only those bar codes scanned during the time between the detection of the leading product edge 137 by the entrance photocell 141a and the detection of the trailing product edge 139 by the exit photocell 141b.

All other bar codes are ignored. The recognized bar codes are stored in a tracking record for the identified product and the tracking record is output to the sorting machine when the product leaves the scanning transport path 100.

In the preferred embodiments of the present invention, the line scanner used is a SCANSTAR 10 Line Scanner and the raster scanner is a SCANSTAR 15 Raster Scanner. The scanners are purchased from Computer Identics of 5 Shawmut Road, Canton, Mass. 02021. Decoding of the optical information output by each raster and line scanner is provided by a SCANSTAR 240 Decoder also purchased from Computer Identics.

Although preferred embodiments of the invention have been illustrated in the accompanying Drawings and described in the foregoing Detailed Description, it will be understood that the invention is not limited to the embodiments disclosed but is capable of numerous rearrangements and modifications of parts and elements without departing from the scope of the invention.

I claim:

1. Bar code reading apparatus, comprising: transport means for moving a stream of products along a transport path through a scanning zone wherein a side of each product is affixed with an identifying bar code;
   at least one raster scanner positioned above the transport path and directed toward the scanning zone for reading a ladder oriented bar code affixed on a top side of a product passing through the scanning zone and outputting an information signal according to the top scanned ladder code;
   at least one line scanner positioned above the transport path and directed toward the scanning zone for reading a picket oriented bar code affixed on a top side of a product passing through the scanning zone and outputting an information signal according to the top scanned picket code;
   at least one line scanner positioned below the transport path and directed toward the scanning zone for reading a picket oriented bar code affixed on a bottom side of a product passing through the scanning zone and outputting an information signal according to the bottom scanned picket code; and
   processing means for receiving and decoding the information signals from the raster and line scanners to identify the affixed bar code on each product.

2. The bar code reading apparatus as in claim 1 wherein the transport means comprises a series of rotational feed rollers.

3. The bar code reading apparatus as in claim 1 wherein the scanning zone is offset from the longitudinal center of the transport means and the transport means includes means for laterally tilting the transport means to cause the stream of products to align and pass through the offset scanning zone.

4. The bar code reading apparatus as in claim 1 further including at least one raster scanner for reading a ladder oriented bar code on a bottom side of a product passing through the scanning zone and outputting an information signal according to the bottom scanned ladder code.

5. The bar code reading apparatus as in claim 1 wherein the processing means further includes means for counting and categorizing products in the stream of products according to the scanned bar codes.

6. The bar code reading apparatus as in claim 1 further including means for identifying bar codes read by the first and second scanning means with individual products in the stream of products by detecting the entrance to, and exit from the scanning zone of each product in the stream, whereby all bar codes read between detecting entrance and exit are assigned to a record maintained for the product passing through the scanning zone.

7. Apparatus for reading bar codes on individual products in a stream of singulated products passing through a scanning zone, comprising:
   a first line scanner positioned on a first side of the scanning zone for reading a bar code affixed on a first surface of a product passing through the scanning zone and outputting an information signal according to the scanned code;
   a second line scanner positioned on a second side of the scanning zone for reading a bar code affixed on a second surface of a product passing through the scanning zone and outputting an information signal according to the scanned code; and
   means for decoding the information signals output by the scanners to identify the bar code affixed to each product.

8. The apparatus as in claim 7 further including a first raster scanner positioned on the first side of the scanning zone for reading a bar code on the first surface of a product passing through the scanning zone and outputting an information signal according to the scanned code.

9. The apparatus as in claim 7 further including a second raster scanner positioned on the second side of the scanning zone for reading a bar code on the second surface of a product passing through the scanning zone and outputting an information signal according to the scanned code.

10. The apparatus as in claim 7 further comprising:
    sensor means for detecting the entrance of a product into the scanning zone and outputting an entrance signal indicative thereof;
    sensor means for detecting the exit of a product from the scanning zone and outputting an exit signal indicative thereof; and
    means responsive to the entrance and exit signals for tracking a product and assigning bar codes scanned by the scanners to a record maintained for each tracked product passing through the scanning zone.

11. The bar code reading apparatus as in claim 10 further including processing means responsive to the tracked products and identified bar codes assigned thereto for categorizing and counting the products in the stream according to the scanned codes.

12. Apparatus for identifying individual products in a singulated stream of products passing through a scanning zone, each product having a bar code affixed to a side thereof, comprising;
    at least one raster scanner positioned for reading a ladder oriented bar code on a first side of a product passing through the scanning zone and outputting scanner information signals related to the bar codes scanned;
    at least one line scanner positioned for reading a picket oriented bar code on the first side of a product passing through the scanning zone and outputting scanner information signals related to the bar codes scanned;

at least one line scanner positioned for reading a picket oriented bar code on a second side of a product passing through the scanning zone;

decoding means responsive to the raster and line scanner information signals for outputting bar code information read for each scanned product; and processing means responsive to bar code information received from the decoding means for counting and categorizing products for further processing according to the scanned bar codes.

13. The apparatus as in claim 12 further comprising at least one raster scanner positioned for reading a ladder type bar code on the second side of a product passing through the scanning zone.

14. The apparatus as in claim 12 further comprising:

first sensor means for detecting the entrance of a product into the scanning zone and outputting a product entrance signal indicative thereof;

second sensor means for detecting the exit of a product from the scanning zone and outputting a product exit signal indicative thereof; and wherein the processing means further includes means responsive to the product entrance and exit signal for tracking products through the scanning zone and assigning bar code information read to a record maintained for each product in the singulated stream.

15. A method for reading bar codes on a surface of each product in a stream of bar coded products, comprising the steps of:

passing the stream of bar coded products through a scanning zone;

scanning products in the scanning zone from at least two different directions to read bar codes present on either of two product surfaces; and identifying the scanned bar codes with individual products in the stream of bar coded products by:
   detecting the entrance of a product into the scanning zone;
   opening a scanner read window for the product;
   detecting the exit of a product from the scanning zone;
   closing the scanner read window for the product; and
   recording any bar code scanned on either surface while the scanner read window was open in a record maintained for the product.

16. The method as in claim 15 wherein the step of scanning products in the scanning zone comprises the step of scanning at least two different surfaces of each product in the stream of bar coded products transported through the scanning zone.

* * * * *